UNITED STATES PATENT OFFICE.

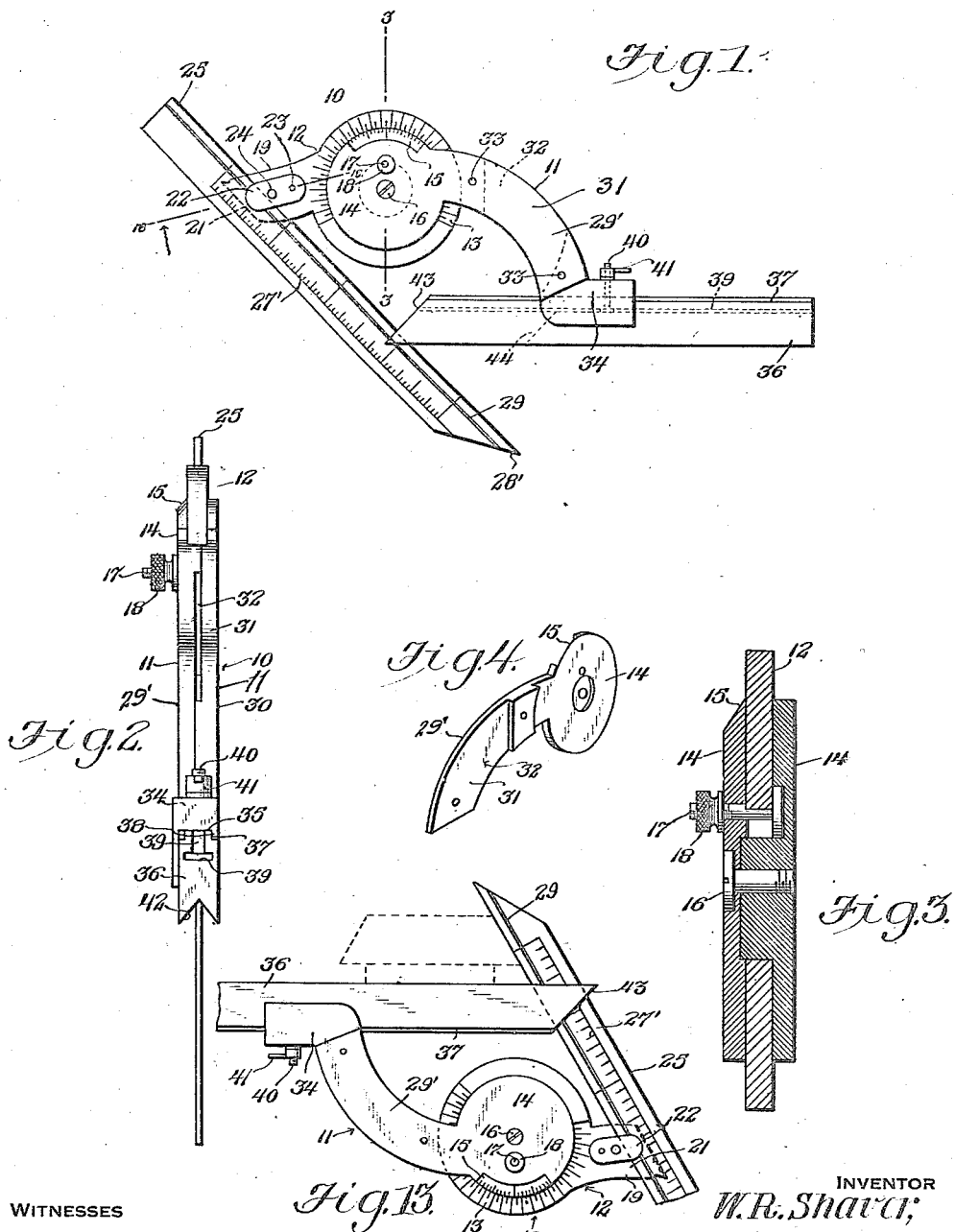

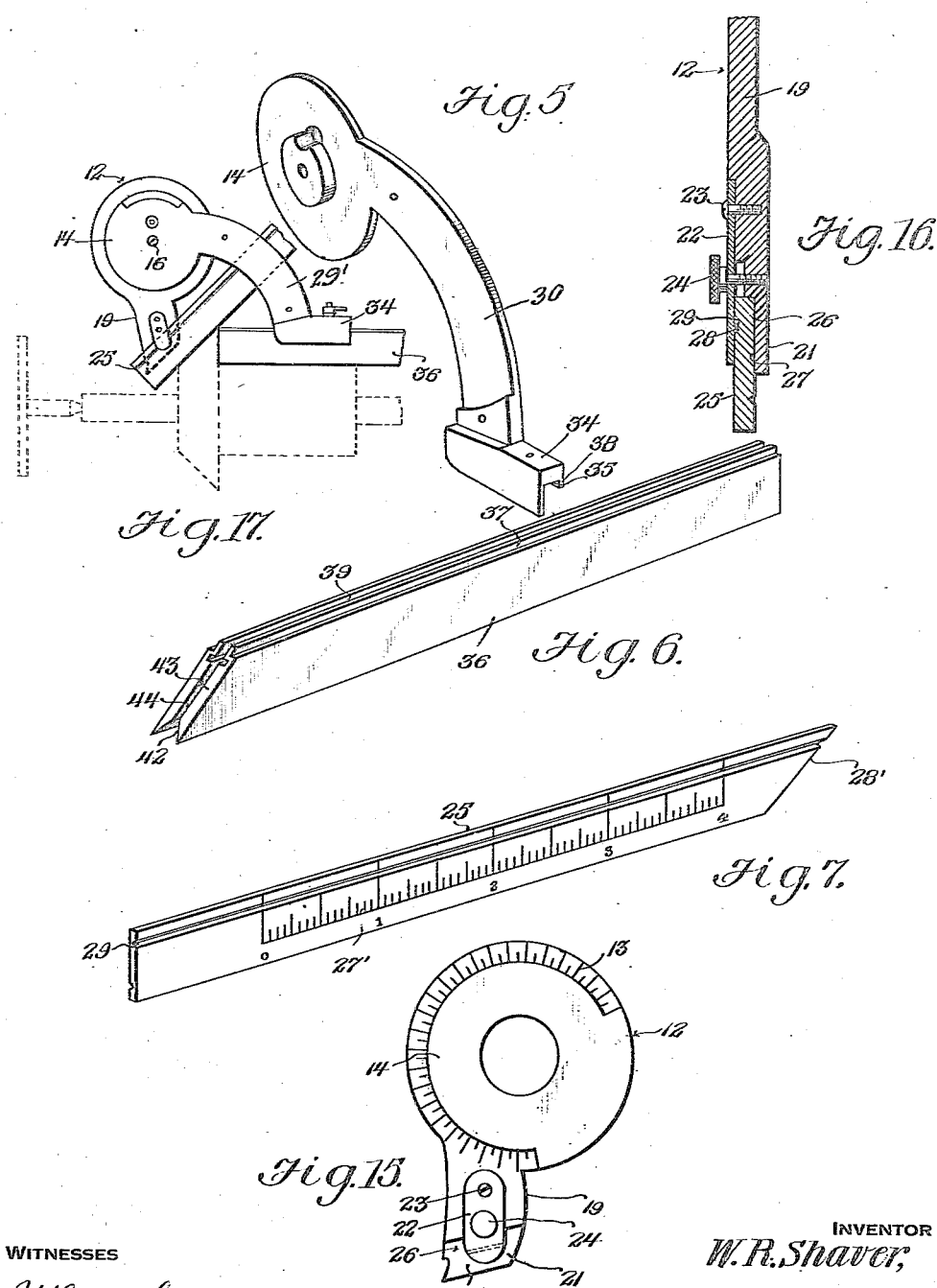

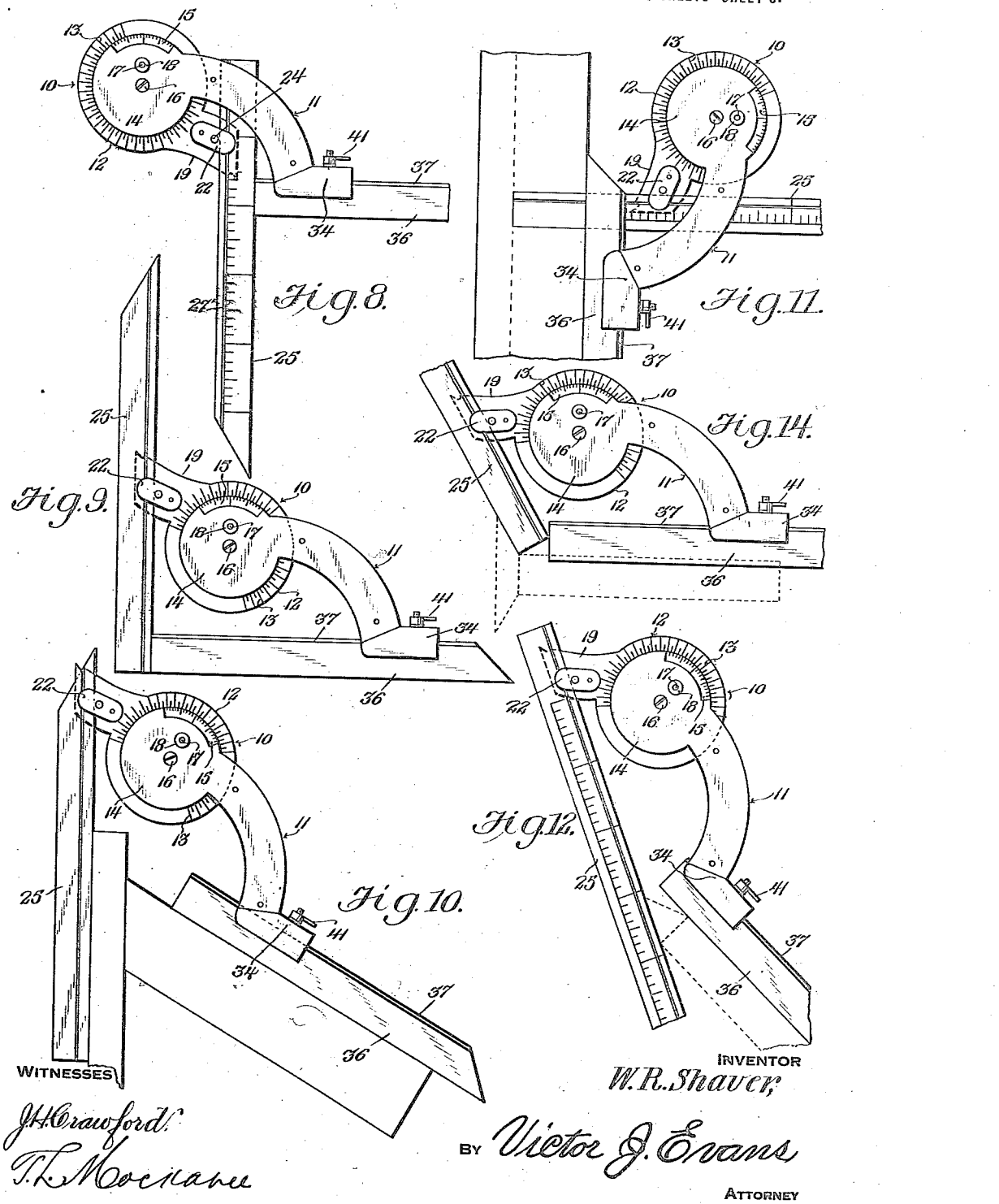

WILLIAM R. SHAVER, OF COVINGTON, VIRGINIA.

COMBINED BEVEL-PROTRACTOR.

1,269,324.   Specification of Letters Patent.   Patented June 11, 1918.

Application filed March 7, 1917. Serial No. 153,025.

*To all whom it may concern:*

Be it known that I, WILLIAM R. SHAVER, a citizen of the United States, residing at Covington, in the county of Alleghany and State of Virginia, have invented new and useful Improvements in Combined Bevel-Protractors, of which the following is a specification.

This invention relates to protractors and especially to instruments of this class used by mechanics and others in laying off various kinds of work.

An object of the invention is to provide an instrument by means of which various angles and depths may be determined, the instrument being capable of adjustment for a wide variety of uses, such as determining the angle of gears, drill points, dove-tailed joints, mortises, bolt and screw heads, depth of openings and holes and for various other purposes.

Another object of the invention is to provide a protractor which may be laid flat upon a drawing or sketch and securely adjusted at the desired angle, so as to correctly gage the work, the angle of adjustment being plainly readable upon the face of the instrument.

A further object is to provide a protractor of simple construction and adjustment, certain of the parts thereof being capable of removal and reversal, thereby, adapting the same to a great variety of uses.

With the above and other objects in view the invention consists of the following novel combination and arrangement of parts, hereinafter more fully described, illustrated in the accompanying drawings and set forth in the appended claims.

In the drawings;—

Figure 1 is a plan view of a protractor embodying the present invention, the instrument being shown in adjusted position for determining an angle of 45°;

Fig. 2 is an edge view of the same looking in the direction of the carrying arm;

Fig. 3 is a sectional view on the line 3—3 of Fig. 1;

Fig. 4 is a detailed perspective view of the section of the body member which includes the carying arm;

Fig. 5 is a detailed perspective view of the section of the body member having the rotating dial;

Fig. 6 is a similar view of one of the adjustable blades;

Fig. 7 is a like view of the other adjustable blade;

Fig. 8 is a plan view of the instrument shown in position for use as an external square;

Fig. 9 is a similar view with the instrument shown in position for use as an internal square;

Fig. 10 is a view showing the blades adjusted at a different angle;

Fig. 11 illustrates the instrument for use as a depth gage;

Fig. 12 illustrates the instrument as used in determining the angle of a drill point;

Fig. 13 shows one manner of using the instrument for determining the angle of the bevel gear; and Fig. 14 is a view showing the instrument as used for determining the angle of a bolt or screw head.

Fig. 15 is a detailed view of the dial section.

Fig. 16 is a sectional view of the same.

Fig. 17 illustrates another manner of using the instrument for obtaining the angle of beveled gears without removing the gears from the lathe.

Referring to the drawings in detail the protractor comprises a body member designated in its entirety by the numeral 10, the said body member comprising the arm carrying section 11 and the dial section 12. The dial section 12 is provided with graduations 13, representing the various degrees of a circle. The section 11 is bifurcated to form spaced disks 14, which are adapted to receive therebetween the dial section 12, Fig. 3, one of these disks being provided with a beveled portion 15, having graduations thereon for coöperation with the graduations 13 for use in determining angles of various degrees. The sections 11 and 12 are pivoted together upon the screw 16, so that the dial section 12 is rotatably mounted within the section 11. In order that the sections may be held in their adjusted position, there is provided a screw 17, which carries a clamping nut 18.

The section 12 is provided with an extension 19, which is reduced at its outer end as shown at 21, Fig. 15 and is provided with a clamping plate 22, said plate being secured to the section 12 by means of the screw 23. The section 12 also carries a clamping screw 24 by means of which a blade 25 may be adjusted within the recess 26 formed between the reduced portion 21 and the clamping plate 22. The recess 26 is provided with a straight blade engaging portion 27 and the plate 22 is provided with a bead 28, Fig. 16, for engagement with a groove 29 formed upon each face of the blade. The blade 25 has upon one of its faces graduations 27' preferably in the form of inches and divisions thereof, so that this blade may be used for measuring the depths of various cuts. One end of the blade 25 is pointed as shown at 28' to permit of its use in the various positions illustrated in the different figures of the drawings.

The section 11 is preferably composed of two pieces 29' and 30, each of said pieces carrying one of the disks 14. When the parts 29' and 30 are secured together they form a blade carrying arm 31, Fig. 1, the part 30 being cut away as shown at 32, to provide a slot for the passage of the blade 25, which may be passed through the said slot for the purpose of securing certain adjustments.

The parts 29' and 30 are secured together by means of screws 33, the part 30 being formed wih a lateral extension 34, which is grooved as shown at 35, Fig. 2 to receive a blade 36. This blade is provided with longitudinally extending angular cuts 37 Fig. 6 along one of its edges, for engagement with the rib 38 formed on the extension 34 of the blade carrying arm. The blade 36 is further provided with a T-shaped groove 39, which is adapted to receive a clamping bolt 40, said bolt carrying an adjusting nut 41, by means of which the blade may be secured in any desired adjusted position within the groove 39. The opposite edge of the blade 36 is angularly grooved as shown at 42, in order that it may be evenly placed upon a rounded surface of a screw or bolt as shown in Fig. 14 of the drawing. One end of the blade 36 is pointed as shown at 43, and is also slotted as shown at 44, permitting the passage therethrough of the blade 25 for various purposes, certain of which are shown in Figs. 11 and 13.

It is believed from the foregoing description and the various illustrations of the accompanying drawings, that the uses and advantages of the invention will be apparent and that a further detailed description is therefore unnecessary.

The right is reserved to make such changes in the form and proportion of the invention as will properly fall within the scope of the claims.

Having described the invention, what I claim, is:

1. A protractor comprising a body member composed of two sections concentrically pivoted together, means for adjustably securing a blade to one of said sections, a slotted arm carried by the other section, said slot being positioned to receive the blade carried by the first mentioned section and means located at the outer end of said slotted arm for adjustably holding another blade.

2. A protractor comprising a body member composed of two sections concentrically pivoted together, means for adjustably securing a blade to one of said sections, a slotted arm carried by the other section, a second blade carried by said slotted arm and means including a T-shaped securing element carried by the arm and engageable with a groove formed in one edge of the last mentioned blade for holding the latter in adjusted position.

3. A protractor comprising a body member composed of two sections concentrically pivoted together, an arm projecting from one of said sections, a reduced portion formed on the outer end of said arm, a blade slidable along said reduced portion, an adjustable plate and a second blade adjustably secured to the other section of the body member, and adapted to be moved into abutting contact with the first mentioned blade.

4. A protractor comprising a body member composed of two sections concentrically pivoted together, a blade adjustably secured to each of said sections, said blades being in the same plane and a longitudinally slotted arm for connecting one of the blades to one section of the body member in a manner to permit of the entrance of the other blade within the slot.

In testimony whereof I affix my signature.

WILLIAM R. SHAVER.